US011043700B2

(12) United States Patent
Nishimoto et al.

(10) Patent No.: US 11,043,700 B2
(45) Date of Patent: Jun. 22, 2021

(54) NON-AQUEOUS ELECTROLYTE RECHARGEABLE BATTERY

(71) Applicant: SAMSUNG SDI CO., LTD., Yongin-si (KR)

(72) Inventors: Atsushi Nishimoto, Yokohama (JP); Yasuo Takano, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 410 days.

(21) Appl. No.: 14/981,374

(22) Filed: Dec. 28, 2015

(65) Prior Publication Data

US 2016/0190654 A1 Jun. 30, 2016

(30) Foreign Application Priority Data

Dec. 26, 2014 (JP) .............................. JP2014-265092
Oct. 8, 2015 (KR) .......................... 10-2015-0141741

(51) Int. Cl.
*H01M 10/0587* (2010.01)
*H01M 50/538* (2021.01)
(Continued)

(52) U.S. Cl.
CPC ... *H01M 10/0587* (2013.01); *H01M 10/0431* (2013.01); *H01M 50/474* (2021.01); *H01M 50/477* (2021.01); *H01M 50/531* (2021.01); *H01M 50/533* (2021.01); *H01M 50/538* (2021.01); *H01M 10/052* (2013.01); *H01M 10/0585* (2013.01); *Y02E 60/10* (2013.01)

(58) Field of Classification Search
None
See application file for complete search history.

(56) References Cited

U.S. PATENT DOCUMENTS

2006/0111625 A1 5/2006 Yamauchi et al.
2008/0233474 A1* 9/2008 Son ..................... H01M 2/0404
429/129
(Continued)

FOREIGN PATENT DOCUMENTS

JP 10-255847 A 9/1998
JP 11-176420 A 7/1999
(Continued)

OTHER PUBLICATIONS

Japanese Office Action dated Oct. 2, 2018, for corresponding Japanese Patent Application No. 2014-265092 (5 pages).

*Primary Examiner* — Barbara L Gilliam
(74) *Attorney, Agent, or Firm* — Lewis Roca Rothgerber Christie LLP

(57) ABSTRACT

Aspects of the present disclosure are directed toward a new and improved non-aqueous electrolyte rechargeable battery that is capable of suppressing or reducing non-uniformity of pressure during the manufacturing process, and thus suppressing or reducing a thickness increase during cycling, as well as a manufacturing method thereof. The present disclosure provides a non-aqueous electrolyte rechargeable battery including: an stacked electrode assembly in which electrodes and a separator are sequentially stacked; current collecting tabs attached to portions of some surfaces of the electrodes; and filling members positioned in vicinities of the current collecting tabs along the surface directions.

14 Claims, 5 Drawing Sheets

(51) Int. Cl.
*H01M 50/477* (2021.01)
*H01M 50/474* (2021.01)
*H01M 50/533* (2021.01)
*H01M 50/531* (2021.01)
*H01M 10/052* (2010.01)
*H01M 10/04* (2006.01)
*H01M 10/0585* (2010.01)

(56) References Cited

U.S. PATENT DOCUMENTS

| | | |
|---|---|---|
| 2009/0111011 A1 | 4/2009 | Kim et al. |
| 2013/0045405 A1 | 2/2013 | Ahn |
| 2014/0120417 A1* | 5/2014 | Matsushita ........... H01M 4/667 |
| | | 429/211 |
| 2014/0349179 A1 | 11/2014 | Chun |
| 2014/0377593 A1 | 12/2014 | Hong |

FOREIGN PATENT DOCUMENTS

| | | |
|---|---|---|
| JP | 2003-157888 A | 5/2003 |
| JP | 2003-297429 A | 10/2003 |
| JP | 2004-303590 A | 10/2004 |
| JP | 2006-164956 A | 6/2006 |
| JP | 2009-110928 A | 5/2009 |
| JP | 2012-174387 A | 9/2012 |
| JP | 2013-41822 A | 2/2013 |
| KR | 10-2014-0139181 A | 12/2014 |
| KR | 10-2015-0000825 A | 1/2015 |

* cited by examiner

NON-AQUEOUS ELECTROLYTE RECHARGEABLE BATTERY

CROSS-REFERENCE TO RELATED APPLICATIONS

This application claims priority to and the benefit of Japanese Patent Application No. 2014-265092 filed in the Japanese Patent Office on Dec. 26, 2014, and Korean Patent Application No. 10-2015-0141741 filed in the Korean Intellectual Property Office on Oct. 8, 2015. The entire content of each application is incorporated herein by reference.

BACKGROUND

1. Field

One or more aspects of embodiments of the present disclosure relate to a non-aqueous electrolyte rechargeable battery.

2. Description of the Related Art

Small, portable, high performance electronic devices require rechargeable batteries that also have high performances, smaller sizes, and high energy densities.

Rechargeable batteries using a non-aqueous electrolyte, such as lithium ion rechargeable batteries, have been actively researched and developed because of their desirable properties, such as a high battery voltage and high energy density.

Non-aqueous electrolyte rechargeable batteries that use a laminate as the exterior body and contain an electrolyte solution and a stacked electrode assembly (e.g., in which the electrodes and a separator are sequentially stacked) are of particular interest since they can be freely shaped and thinly formed.

However, during the manufacturing process of such non-aqueous electrolyte rechargeable batteries, the stacked electrode assembly may be pressed.

For example, when the stacked electrode assembly is manufactured as a flattened cylindrical electrode assembly, the stacked electrode assembly is pressed.

A manufacturing process for a flattened cylindrical electrode assembly will now be described.

A positive electrode, a negative electrode, and a separator are sequentially stacked to manufacture a stacked electrode assembly.

Prior to stacking the positive and negative electrodes, current collecting tabs (also referred to as current collecting leads) are welded to the positive and negative electrodes.

Next, the stacked electrode assembly is cylindrically wound, in accordance with the configuration described above.

In this case, the current collecting tabs are positioned at the innermost circumferential parts of the wound electrode assembly.

Subsequently, the cylindrically wound electrode assembly is pressed to manufacture the flattened cylindrical electrode assembly.

The above information disclosed in this Background section is only to enhance the understanding of the background of the disclosure, and therefore it may contain information that does not form the prior art that is already known in this country to a person of ordinary skill in the art.

SUMMARY

As described above, the current collecting tabs are included in the stacked electrode assembly.

The current collecting tabs are structural bodies that protrude from the top of the cylinder and lie parallel to the vertical length of the stacked electrode assembly (e.g., perpendicular to the circumference of the flattened cylinder). Therefore, parts of the stacked electrode assembly which overlap the current collecting tabs are thicker than the rest of the assembly by the thickness of the current collecting tabs. Accordingly, when the stacked electrode assembly is pressed, pressure is non-uniformly applied to the stacked electrode assembly.

For example, when the flattened cylindrical electrode assembly is manufactured, a cylindrically wound electrode assembly is pressed. In this case, spaces within the stacked electrode assembly and around the current collecting tabs are formed in vicinities of the current collecting tabs along the surface direction (e.g., parallel to the flattened surface of the electrode stack).

Accordingly, when the stacked electrode assembly is pressed, different pressures are applied to different parts of the assembly, according to the presence of the abovementioned spaces or tabs within the stack. Pressure is non-uniformly applied to the stacked electrode assembly.

As a result, the combined thickness of the electrodes and the separator constructing the stacked electrode assembly may vary throughout the electrode assembly.

When the thicknesses of the electrode and the separator are not uniform, current density may not be uniformly distributed during charging and discharging. Accordingly, distortion and/or deformation may occur within the stacked electrode assembly, and buckling and/or the like may be generated. The distortion, deformation, and/or buckling may cause lithium metal to be deposited within the electrode assembly, and the thickness of the electrode assembly may increase.

As such, the thickness of the non-aqueous electrolyte rechargeable battery may be increased due to non-uniformity in the thickness of the current collecting tab.

This problem may be severe when the exterior body is formed of a laminate film. When the exterior body is formed of a metallic can, the exterior body may suppress or reduce deformation of the electrode assembly to a certain degree. However, since a laminate film has less strength than a metallic can, it is difficult for the laminate film to suppress or reduce deformation of the electrode assembly.

Aspects of embodiments of the present disclosure are directed toward an effort to solve the problems as described above, and to provide a new and improved non-aqueous electrolyte rechargeable battery that is capable of suppressing or reducing non-uniformity of pressure and thus suppressing or reducing an increase in battery thickness, and a manufacturing method thereof.

An example embodiment of the present disclosure provides a non-aqueous electrolyte rechargeable battery including: a stacked electrode assembly in which electrodes and a separator are sequentially stacked; current collecting tabs attached to one or more portions of surfaces of the electrodes; and filling members positioned in vicinities of the current collecting tabs along their surface directions.

When the filling members fill the spaces within the stacked electrode assembly near the current collecting tabs, non-uniformity of pressure may be suppressed or reduced, and thus the thickness increase of the non-aqueous electrolyte rechargeable battery may also be suppressed or reduced.

A surface of the filling member may be aligned with a surface of the current collecting tab.

Since the filling member can more reliably fill the spaces within the stacked electrode assembly and near the current collecting tabs, non-uniformity of pressure may be suppressed or reduced, and thus the thickness increase of the non-aqueous electrolyte rechargeable battery may also be suppressed or reduced.

The stacked electrode assembly may be an electrode assembly in which the electrodes and the separator are wound, the current collecting tabs are positioned at the innermost circumferential parts of the electrode assembly, and the filling members are positioned in spaces surrounded by the electrode assembly and the electrodes.

In this case, since the filling members can more reliably fill the spaces within the stacked electrode assembly and near the current collecting tabs, non-uniformity of pressure may be suppressed or reduced, and thus the thickness increase of the non-aqueous electrolyte rechargeable battery may also be suppressed or reduced.

The separator may include a thick region formed over the electrode and a thin region not formed over the electrode, and the filling member in the thin region may be thicker than the filling member in the thick region.

In this case, since the filling member can more reliably fill the spaces within the electrode stacked body and near the current collecting tabs, non-uniformity of pressure may be suppressed or reduced, and the thickness of the non-aqueous electrolyte rechargeable battery may also be suppressed or reduced.

Another example embodiment of the present disclosure provides a manufacturing method of a non-aqueous electrolyte rechargeable battery, including: forming current collecting tabs on one or more portions of surfaces of the electrodes; installing filling members in vicinities of the current collecting tabs along their surface directions; manufacturing a stacked electrode assembly by sequentially stacking the electrodes including the current collecting tabs and the filling members with a separator; and pressing the stacked electrode assembly.

In this case, since the filling members can more reliably fill the spaces within the stacked electrode assembly near the current collecting tabs, non-uniformity of pressure may be suppressed or reduced, and thus the thickness increase of the non-aqueous electrolyte rechargeable battery may also be suppressed or reduced.

As described above, according to the present disclosure, since the filling members can fill the spaces within the stacked electrode assembly and near the current collecting tabs, non-uniformity of pressure may be suppressed or reduced, and thus the thickness increase of the non-aqueous electrolyte rechargeable battery may also be suppressed or reduced.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
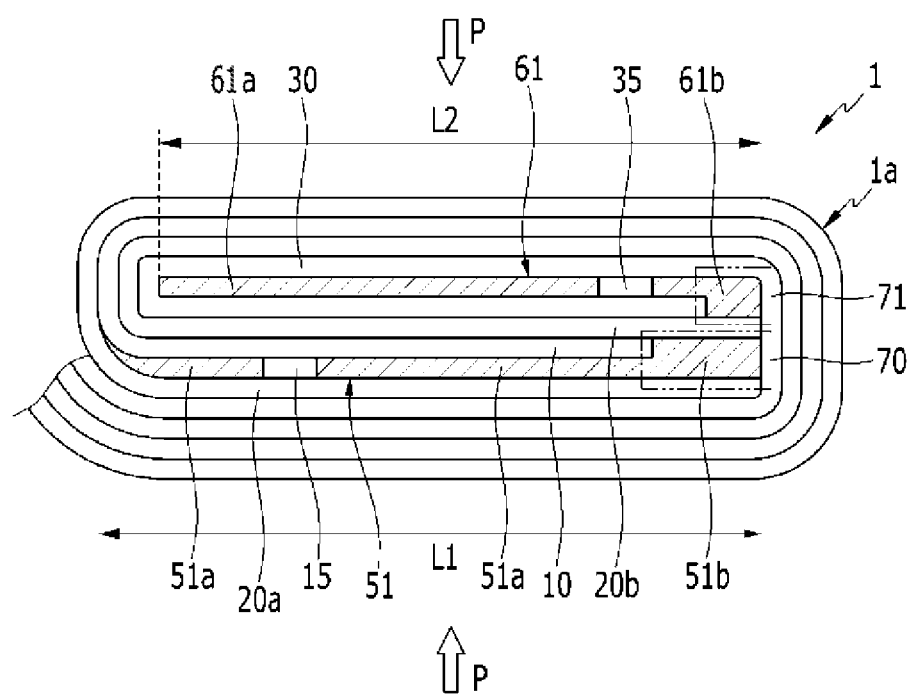
FIG. 1 is a horizontal cross-sectional view of a schematic configuration of a electrode assembly according to an example embodiment.

The present disclosure will be described more fully hereinafter with reference to the accompanying drawings, in which example embodiments of the present disclosure are shown.
In the drawings, like reference numerals refer to like elements or elements having like functions throughout, and repeated explanation thereof will not be provided. The thicknesses of layers, films, panels, regions, etc., may be exaggerated in the drawings for clarity. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Figure 5:
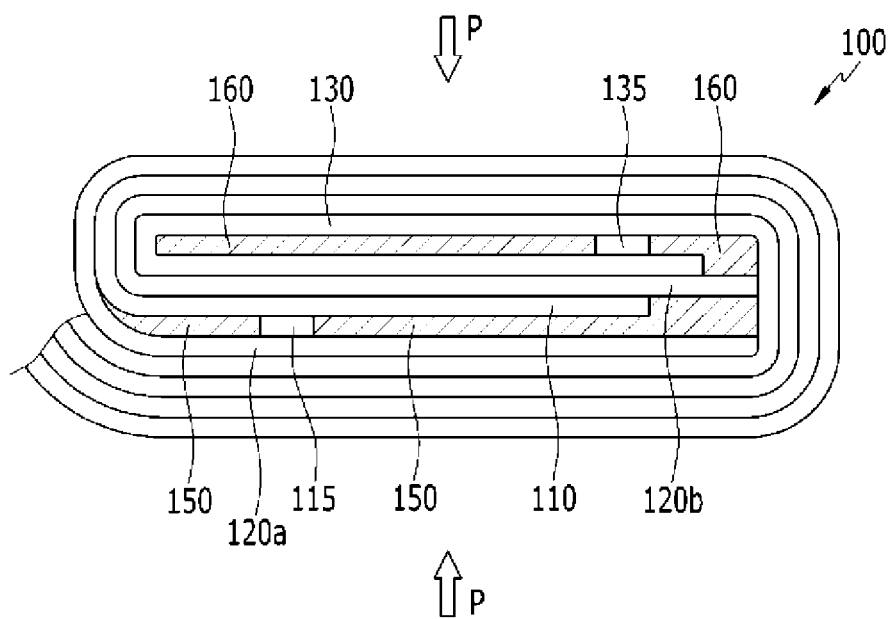
FIG. 5 is a horizontal cross-sectional view of an example embodiment in which a related art electrode assembly is pressed.

FIG. 5 illustrates a related art electrode assembly being pressed.

Referring to FIG. 5, a manufacturing method of the electrode assembly will be briefly described.

A strip-shaped separator 120*a*, a strip-shaped positive electrode 110, a strip-shaped separator 120*b*, and a strip-shaped negative electrode 130 are sequentially stacked to manufacture a stacked electrode assembly.

Figure 2:
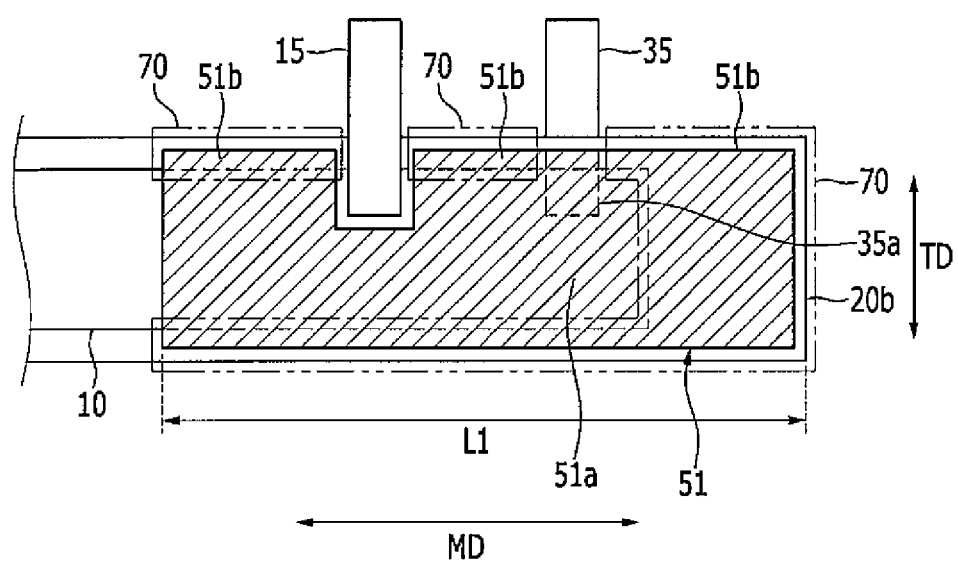
FIG. 2 is a drawing illustrating a schematic configuration of an electrode assembly including a positive electrode, a positive electrode current collecting tab, a separator, and a positive electrode filling member according to an example embodiment.
Figure 3:
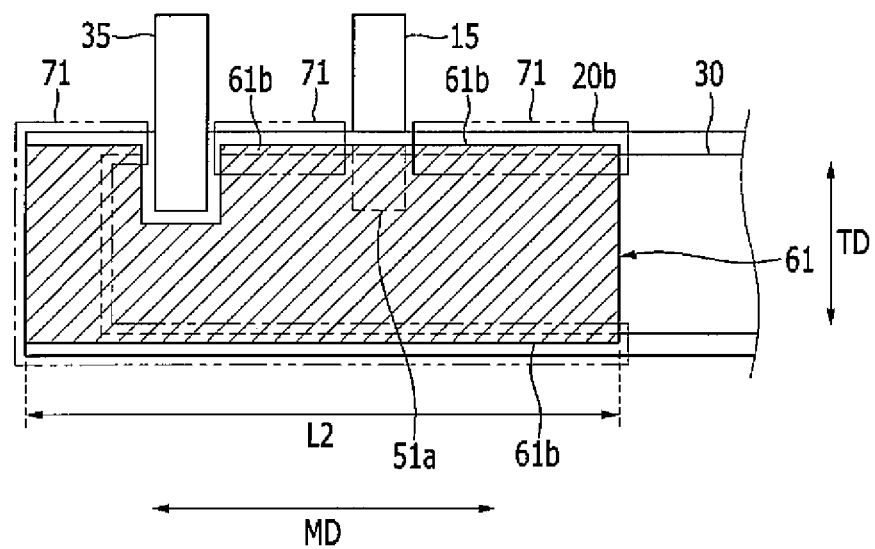
FIG. 3 is a drawing illustrating a schematic configuration of an electrode assembly including a negative electrode, a negative electrode current collecting tab, a separator, and a negative electrode filling member according to an example embodiment.

Prior to stacking the positive electrode 110, a current collecting tab 115 is welded to an end portion of the positive electrode 110 parallel to the vertical length direction (e.g., TD direction as in FIG. 2 and FIG. 3).

Prior to stacking the negative electrode 130, a current collecting tab 135 is welded to an end portion of the negative electrode 130 parallel to the vertical length direction.

Next, the stacked electrode assembly is cylindrically wound to manufacture a cylindrically wound electrode assembly 100 (e.g., jelly roll). The current collecting tabs 115 and 135 are positioned in an innermost circumferential part of the electrode assembly 100.

Next, the cylindrically wound electrode assembly 100 is pressed to manufacture a flattened cylindrically wound electrode assembly 100. The arrows P illustrated in FIG. 5 designate the pressing direction (e.g., the direction of applied pressure).

As is clearly shown in FIG. 5, the current collecting tab 115 and 135 are structural bodies that protrude from the top of the flattened cylinder and lie parallel to the vertical length of the stacked electrode assembly (e.g., perpendicular to the circumference of the flattened cylinder). Accordingly, regions of the stacked electrode assembly that include the current collecting tabs 115 and 135 are thicker, by the thicknesses of the current collecting tabs, than the regions of the rest of the assembly that do not.

Accordingly, when the stacked electrode assembly is pressed, pressure is non-uniformly applied to the stacked electrode assembly. For example, as the stacked electrode assembly is pressed, a surface of the negative electrode current collecting tab 135 that is not welded to a surface of the negative electrode 130 may press against the separator 120a.

In this case, spaces 150 and 160 within the stacked electrode assembly and near the current collecting tabs 115 and 135 are formed around the current collecting tab 115 and 135 along a surface direction (e.g., parallel to the flattened surface of the electrode stack).

When the stacked electrode assembly is further pressed, different pressures are applied to different regions of the assembly, depending on the presence of the current collecting tabs 115 and 135 or the spaces 150 and 160 within the stacked assembly. For example, pressure is non-uniformly applied to the stacked electrode assembly.

Therefore, the combined thickness of the positive electrode 110, the negative electrode 130, and the separators 120a and 120b may vary. When the combined thickness of the positive electrode 110, the negative electrode 130, and the separators 120a and 120b varies, current density may not be uniform during charging and discharging. As a result, distortion and/or buckling may occur inside the stacked electrode assembly Accordingly, aspects of embodiments of the present disclosure are directed towards a method for reducing the volumes of the spaces 150 and 160 by filling the spaces 150 and 160 with filling members.

2. Configuration of Electrode Assembly

Next, based on FIGS. 1 to 3, a configuration of a non-aqueous electrolyte rechargeable battery according to an example embodiment of the present disclosure will be described in more detail.

The non-aqueous electrolyte rechargeable battery 1 may include a flattened cylindrical electrode assembly 1a, a positive electrode current collecting tab 15, a positive electrode filling member 51, a negative electrode current collecting tab 35, a negative electrode filling member 61, a non-aqueous electrolyte solution, and an exterior body.

The electrode assembly 1a may be formed by winding an stacked electrode assembly, in which a strip-shaped separator 20a, a strip-shaped positive electrode 10, a strip-shaped separator 20b, and a strip-shaped negative electrode 30 are sequentially stacked, and then pressing the stacked and wound electrode assembly in the direction of the arrows P. (Configuration of Strip-Shaped Positive Electrode and Positive Electrode Current Collecting Tab)

The strip-shaped positive electrode 10 (hereinafter referred to as positive electrode 10) includes a positive electrode current collector, and positive electrode active material layer(s) formed on opposite surfaces of the positive electrode current collector.

The positive electrode active material layer(s) may include at least a positive electrode active material, and some embodiments may include a conductive agent and/or a binding agent.

The positive electrode active material is not particularly limited as long as the material can suitably absorb and discharge lithium ions in a reversible way, and for example, may include lithium cobalt oxide (LCO), lithium nickel oxide, lithium nickel cobalt oxide, lithium nickel cobalt aluminum oxide (hereinafter also referred to as NCA), lithium nickel cobalt manganic acid (hereinafter also referred to as NCM), lithium manganic acid, lithium iron phosphate, nickel sulfide, copper sulfide, sulfur, iron oxide, and/or vanadium oxide.

The positive electrode active materials may be individually used, or two or more kinds thereof may be used together.

In some embodiments, the positive electrode active material is a lithium salt of a transition metal oxide having a layered rock-salt structure.

Non-limiting examples of the lithium salt of a transition metal oxide having such a layered rock salt structure may include a lithium salt of a ternary transition metal oxide represented by $Li_{1-x-y-z}Ni_xCo_yAl_zO_2$(NCA) and $Li_{1-x-y-z}Ni_xCo_yMn_zO_2$(NCM) ($0<x<1$, $0<y<1$, $0<z<1$, and $x+y+z<1$).

Examples of the conductive agent may include a carbon black (such as Ketjenblack and acetylene black), natural graphite, synthetic graphite, etc., but are not specifically limited as long as the material can suitably enhance the conductivity of the positive electrode.

The binding agent may be mixed with the positive electrode active materials, and may promote adherence of the positive electrode active material to the positive electrode current collector.

The binding agent is not particularly limited to a specific kind, and any suitable binding agent used in positive electrode active material layers of related lithium ion rechargeable batteries may be included.

For example, the binding agent may include polyvinylidene fluoride (PVDF), a vinylidene fluoride (VDF)-hexafluoropropylene (HFP) copolymer, a vinylidene fluoride-perfluorovinyl ether copolymer, a vinylidene fluoride-tetrafluoroethylene copolymer, a vinylidene fluoride-trifluoroethylene copolymer, an ethylene-propylene-diene terpolymer, styrene-butadiene rubber (SBR), acrylonitrile-butadiene rubber, fluororubber, polyvinyl acetate (PVA), polymethylmethacrylate (PMMA), polyethylene, and/or cellulose nitrate, but it is not specifically limited as long as it can suitably bind the positive electrode active material and the conductive agent to the positive electrode current collector.

The positive electrode current collector may be formed of any suitable conductor, and for example, may be formed of aluminum, stainless steel, and/or nickel-plated steel. A positive electrode terminal may be connected to the positive electrode current collector.

As shown in FIG. 2, the horizontal length (FIG. 2, MD direction) and the vertical length (FIG. 2, TD direction) of the positive electrode 10 may be smaller than those of the strip-shaped separator 20b (hereinafter referred to as the separator 20b). This is to suppress or reduce the chances of the positive electrode 10 contacting and forming a short-circuit with the negative electrode 30.

Accordingly, the separator 20b may be included in a region including the positive electrode 10 (a thick region) and a region not including the positive electrode 10 (a thin region).

In FIGS. 1 and 2, the thin region is represented as region 70.

The positive electrode 10 may be manufactured by an example method described below.

The materials to be included in the positive electrode active material layer may be dispersed in an organic solvent and/or water to form a positive electrode mixture slurry, and the positive electrode mixture slurry may be coated on the current collector.

Accordingly, a coating layer may be formed.

Next, the coating layer may be dried.

The dried coating layer may be rolled together with the positive electrode current collector.

Accordingly, the positive electrode 10 may be manufactured.

The positive electrode current collecting tab 15 may be, for example, formed of the same material as the positive electrode current collector.

The positive electrode current collecting tab 15 may be welded to a front end of the positive electrode 10 parallel to the vertical length direction.

The positive electrode current collecting tab 15 may be positioned in an innermost circumferential part of the electrode assembly 1*a*.

(Configuration of Positive Electrode Filling Member)

Next, based on FIGS. 1 and 2, an embodiment of a configuration of the positive electrode filling member 51 will be described.

The positive electrode filling member 51 may be positioned in the vicinity of the positive electrode current collecting tab 15 along a surface direction, for example, in a region surrounded by the positive electrode current collecting tab 15 and the stacked electrode assembly (e.g., a space 150 shown in FIG. 5).

The positive electrode filling member 51 may be positioned to fill the space 150.

A portion 51*b* of the positive electrode filling member 51 in the thin region may be thicker than a portion 51*a* in the thick region.

The surface of the positive electrode filling member 51 that faces the separator 20*a* may be aligned with a surface of the positive electrode current collecting tab 15 that is not welded to the positive electrode 10, such that the surfaces are flat, or parallel to each other without having a step.

The thickness of the filling member portion 51*a* in the thick region may be larger than that of the positive electrode current collecting tab 15.

The width of the positive electrode filling member 51 may be the same as that of the separator 20*a* and that of the separator 20*b*.

In FIG. 2, the border of the positive electrode filling member 51 is drawn to appear slightly smaller than of the separator 20*b* in order to easily illustrate the manner in which the respective layers overlap each other; however, the comparative sizes are not limited thereto.

The length L1 of the positive electrode filling member 51 may be predetermined or set to fill the entire space 150.

The material for forming the positive electrode filling member 51 is not specifically limited, but it should be a suitable material that is stable when the electrolyte is present.

One or more embodiments may include an insulating material.

The insulating material may be used to form the separators 20*a* and 20*b*.

In addition to the insulating material, aluminum foil and/or the like may be used to form the positive electrode filling member 51.

(Configuration of Negative Electrode and Negative Electrode Current Collecting Tab)

The strip-shaped negative electrode 30 (hereinafter referred to as a negative electrode 30) may include a negative electrode current collector, and negative active material layer(s) formed on opposite surfaces of the negative electrode current collector.

Any suitable negative active material layer(s) may be used.

The negative active material layer may include a negative active material, and some embodiments may include a binding agent.

Non-limiting examples of the negative active material for a negative active material layer may include a mixture of particles of a graphite active material (synthetic graphite, natural graphite, a mixture of synthetic graphite and natural graphite, and/or natural graphite coated with synthetic graphite), silicon (Si), tin (Sn), and/or oxides thereof, an alloy using silicon or tin as a base material, and a titanium oxide (TiO$_x$) based compound such as Li$_4$Ti$_5$O$_{12}$ A silicon oxide may be represented by SiO$_x$ (0≤x≤2).

In some embodiments, a lithium metal and/or the like may be used as the negative active material.

The negative electrode current collector is not particularly limited as long as it is a suitable conductor, and may include, for example, one or more selected from copper, stainless steel, and nickel-plated steel.

Figure 4:
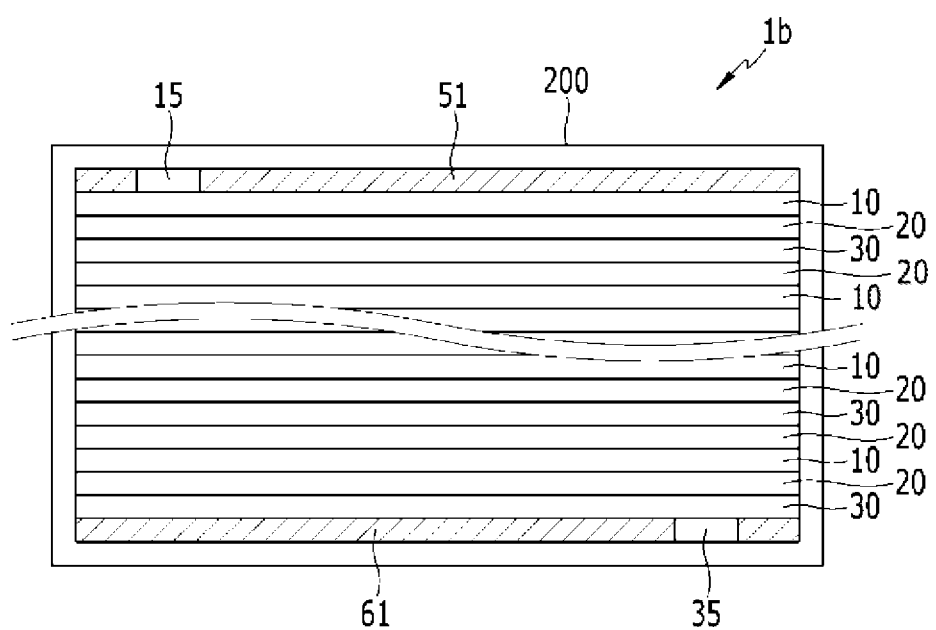
FIG. 4 is a side cross-sectional view of a modified example embodiment of the non-aqueous electrolyte rechargeable battery.

As shown in FIG. 4, the horizontal length (FIG. 3, MD direction) and the vertical length (FIG. 3, TD direction) of the negative electrode 30 may be smaller than those of the separator 20*b*. This is to suppress or reduce the negative electrode 30 from contacting and forming a short-circuit with the positive electrode 10.

In some embodiments, the length and the width of the negative electrode 30 may be greater than the length and the width of the positive electrode 10. Therefore, on the separator 20*b*, a region formed with the negative electrode 30 (a thick region) and a region not formed with the negative electrode 30 (a thin region) may be present. In FIGS. 1 and 3, the thin region is represented by region 71.

The negative electrode 30 may be manufactured using the example method described below.

First, a mixture of a negative active material and a binding agent may be dissolved in an organic solvent (e.g., N-methyl-2-pyrrolidone) in a desired or suitable ratio to form a slurry.

Next, the slurry may be formed on a negative electrode current collector (e.g., coated), and then dried to form a negative active material layer.

The negative active material layer may be compressed to have a desired or suitable thickness.

Accordingly, the negative electrode 30 may be manufactured.

The thickness of the negative active material layer is not specifically limited.

In some embodiments, when lithium metal is used as the negative active material layer, a lithium metal foil may overlap the negative electrode current collector.

For example, the negative electrode current collecting tab 35 may be formed of the same material as the negative electrode current collector.

The negative electrode current collecting tab 35 may be welded to a front end of the negative electrode 30 parallel to the vertical length direction. A portion of the tab 35*a* may be positioned within the stacked electrode assembly.

The negative electrode current collecting tab 35 may be positioned in an innermost circumferential part of the electrode assembly 1*a*.

(Configuration of Negative Electrode Filling Member)

Next, based on FIGS. 1 and 3, an example configuration of an embodiment of the negative electrode filling member 61 will be described.

The negative electrode filling member 61 may substantially be similar to the positive electrode filling member 51.

The negative electrode filling member 61 may be positioned in the vicinity of the negative electrode current collecting tab 35 along a surface direction, and in a region near the negative electrode current collecting tab 35 within the stacked electrode assembly (e.g., within a space 160 shown in FIG. 5).

The negative electrode filling member 61 may fill the space 160.

A portion 61b of the negative electrode filling member 61 in the thin region may be thicker than a portion 61a in the thick region.

As a result, a surface of the negative electrode filling member 61 that contacts the negative electrode 30 when the electrode assembly 1a is pressed) may be aligned with a surface of the negative electrode current collecting tab 35 that is not welded to the negative electrode 30.

The thickness of the portion 61a in the thick region may be larger than that of the negative electrode current collecting tab 35.

The width of the negative electrode filling member 61 may be the same as those of the separators 20a and 20b.

In FIG. 3, the border of the negative electrode filling member 61 is drawn to appear slightly smaller than the separator 20b in order to easily illustrate the manner in which respective layers overlap each other; however, the comparative sizes are not limited thereto.

The length L2 of the negative electrode filling member 61 may be predetermined or set to fill the entire space 160.

A suitable material for forming the negative electrode filling member 61 may be the same material used to form the positive electrode filling member 51.

(Configuration of Separator)

The separators 20a and 20b are not specifically limited as long are they can be suitably used as separators of the lithium-ion rechargeable batteries.

A porous layer and/or a non-woven fabric showing excellent high discharging performance may be individually or collectively used as the separators 20a and 20b.

The separators 20a and 20b may be, for example, formed of a resin such as a polyolefin-based resin represented by polyethylene and polypropylene, a polyester-based resin represented by polyethylene terephthalate and polybutylene terephthalate, PVDF, a vinylidene fluoride (VDF)-hexafluoro propylene (HFP) copolymer, a vinylidene fluoride-perfluorovinyl ether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoropropylene copolymer, and/or a vinylidene fluoride-ethylene-tetrafluoroethylene copolymer.

In some embodiments, an adhesive layer may be formed on opposite surfaces of the separators 20a and 20b.

The adhesive layer may enhance adhesion between each electrode and the separators 20a and 20b, and may be formed as a porous body.

The adhesive layer is not specifically limited as long as it is suitably used in the non-aqueous electrolyte rechargeable battery.

The adhesive layer may be formed of a polyvinylidene fluoride (PVDF)-based fluoro resin.

In some embodiments, in addition to PVDF, a copolymer of vinylidene fluoride (VDF) and another monomer (such as hexafluoro propylene (HFP)) may be used as the fluoro resin.

The adhesive layer including a fluoro-based resin may be formed on the surfaces of the separators 20a and 20b using at least one selected from a first method and a second method, described below.

In the first method, a fluoro resin may be dissolved in an organic solvent such as N-methyl pyrrolidone, dimethyl acetamide, and acetone to form a slurry.

Next, after coating the slurry on the separators 20a and 20b, the fluoro resin may be phase-separated using a poor solvent such as water, methanol, and/or tripropylene glycol, such that the adhesive layer is formed as a porous fluoro resin.

In the second method, the fluoro resin may be dissolved in a heated electrolyte solution using dimethyl carbonate, propylene carbonate, and/or ethylene carbonate as a solvent, thereby manufacturing a heated slurry.

Next, the heated slurry may be coated on the separators 20a and 20b to form a coating layer.

Next, the coating layer may be cooled to transform the fluoro resin into a gel (e.g., a porous layer swollen by an electrolyte solution).

Accordingly, an adhesive layer may be formed.

An explanation as to why the adhesive layer is formed on the surfaces of the separators 20a and 20b is described as follows.

When the exterior body is formed of a laminate, the positive and negative electrodes 10 and 30 may easily expand and/or contract during charging and discharging.

As a result of such expansion and contraction, a point inside the non-aqueous electrolyte rechargeable battery 1 where stress is concentrated may be formed, and buckling and/or distortion of the non-aqueous electrolyte rechargeable battery 1 may occur at this point.

As the buckling and/or distortion are increasingly generated, the distance between the positive and negative electrodes 10 and 30 may not be uniform, thereby preventing or reducing smooth transfer of lithium ions.

As a result, capacity degradation may be significantly increased upon extended charging and discharging cycles, associated with an increase in the thickness of the battery.

The adhesive layer may be formed on the surfaces of the separators 20a and 20b to suppress or reduce the buckling and distortion of the non-aqueous electrolyte rechargeable battery 1.

When adhesion between the separators 20a and 20b and each electrode is improved by the adhesive layer on the surfaces of the separators 20a and 20b, the distortion associated with stress inside the battery, and non-uniformity of the distance between the positive and negative electrodes may be suppressed or reduced.

However, to enable the adhesive layers to show adhesive properties, a heat press process may be necessary, in which a stacked electrode assembly is pressed under a predetermined or set pressure and temperature while the electrolyte solution is present.

The heat press process may be performed at a high temperature in which a sol-gel transition of the polymer may occur. Accordingly, the polymer of the adhesive layer may diffuse into minute holes of the electrode or the separator (e.g., exhibit an anchor effect).

In some embodiments, the polymer of the adhesive layer may interact with a binder that is present on the surface of the electrode.

Due to the interaction therebetween, adhesion between the electrodes may be achieved.

In one embodiment, the heat press conditions may include, for example, a temperature of 25° C. to 150° C. and a pressure of 10 to 100 kgf/cm$^2$, but embodiments of the present disclosure are not limited thereto.

When the temperature is below 25° C., sufficient adhesion between the separators 20a and 20b, the positive electrode 10, and the negative electrode 30 may not be achieved.

When the temperature exceeds 150° C., the electrolyte solution may boil and thus gas may be generated.

When the pressure is below 10 kgf/cm$^2$, sufficient adhesion may not be achieved between the separators 20a and 20b, the positive electrode 10, and the negative electrode 30.

When the pressure exceeds 100 kgf/cm$^2$, the stacked electrode assembly may be excessively pressed and thus exhibit deteriorated characteristics.

In the current example embodiment, since the filling members 51 and 61 are positioned around the current collecting tabs 15 and 35 along the surface direction, pressure applied to the stacked electrode assembly when performing the heat press may be more uniform.

As a result, more uniform adhesion of the adhesive layer may be achieved on the interfacial surfaces between the positive electrode 10 and the negative electrode 30, and the adhesive layer may be formed to have a more uniform thickness.

As a result, the distortion and buckling of the non-aqueous electrolyte rechargeable battery 1 may be suppressed or reduced.

A heat-resistant filler may be added to the adhesive layer to improve heat resistance of the non-aqueous electrolyte rechargeable battery 1.

The heat-resistant filler may include, for example, ceramic particles, and in some embodiments, metal oxide particles.

Non-limiting examples of the metal oxide particles may include fine particles such as alumina, boehmite, titania, zirconia, magnesia, zinc oxide, aluminum hydroxide, and magnesium hydroxide.

(Configuration of Non-Aqueous Electrolyte Solution)

The non-aqueous electrolyte solution is a solution in which an electrolyte salt is dissolved in an organic solvent. The electrolyte is not specifically limited, and in the current example embodiment, a Group 1A salt may be suitably used as the electrolyte.

Non-limiting examples of a Group 1A salt may include an inorganic ion salt including one selected from lithium (Li), sodium (Na), or potassium (K), such as $LiClO_4$, $LiBF_4$, $LiAsF_6$, $LiPF_6$, $LiPF_{6-x}$ $(C_nF_{2n+1})_x$ (1<x<6, n=1 or 2), LiSCN, LiBr, LiI, $Li_2SO_4$, $Li_2B_{10}Cl_{10}$, $NaClO_4$, NaI, NaSCN, NaBr, $KClO_4$, and KSCN, and/or an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $[Li(CH_3)_4N][BF_4]$, $[Li(CH_3)_4N]Br$, $[Li(C_2H_5)_4N]ClO_4$, $[Li(C_2H_5)_4N]I$, $[Li(C_3H_7)_4N]Br$, $[Li(n-C_4H_9)_4N][ClO_4]$, $[Li(n-C_4H_p)_4N]I$, $[Li(C_2F_5)_4N]$ malate, $[Li(C_2H_5)_4N]$ benzoate, $[Li(C_2H_5)_4N]$ phthalate, stearyl sulfonic acid lithium, octyl sulfonic acid lithium, and dodecyl benzene sulphonic acid lithium. These ionic compounds may be individually used and/or two or more of them may be mixed.

The concentration of the electrolyte salt may be substantially the same as that used in the non-aqueous electrolyte solutions of other lithium rechargeable batteries in the art, and it is not specifically limited.

In some example embodiments, a non-aqueous electrolyte solution containing a suitable lithium compound (electrolyte salt) in a concentration of about 0.8-1.5 mol/L may be used.

Non-limiting examples of the organic solvent may include cyclic carbonic acid esters (such as propylene carbonate, ethylene carbonate, butylene carbonate, chloroethylene carbonate, and vinylene carbonate); cyclic esters (such as γ-butyrolactone and γ-valerolactone); chain carbonates (such as dimethyl carbonate, diethyl carbonate, and ethyl methyl carbonate); chain esters (such as methyl formate, methyl acetate, butyric acid methyl, ethyl acetate, and ethyl propionate); tetrahydrofuran or derivatives thereof; ethers (such as 1,3-dioxane, 1,4-dioxane, 1,2-dimethoxyethane, 1,4-dibutoxyethane, and methyl diglyme); nitriles (such as acetonitrile and benzonitrile); dioxolane or derivatives thereof; ethylene sulfide, sulfolane, sultone, and/or derivatives thereof. The selected solvents may be used alone or as a mixture of two or more, but they are not limited thereto.

The non-aqueous electrolyte solution may be impregnated in the separators 20a and 20b.

As described above, a conduction aid and/or an additive may be added to each of the electrodes.

(Configuration of Exterior Body)

The configuration of the exterior body is not specifically limited, and any exterior body available in the art related to a non-aqueous electrolyte rechargeable battery may be suitably used in the current example embodiment.

For example, the exterior body may be formed of a laminate such as an aluminum laminate.

When the exterior body is formed of a laminate, it may be difficult for the exterior body to suppress or reduce changes in the shape of the stacked electrode assembly.

Accordingly, the current example embodiment may exhibit significant beneficial effects.

In the embodiment of FIG. 1, a filling member is positioned in each of the vicinities of the positive and negative electrode current collecting tabs 15 and 35, but in an alternate embodiment, it may be positioned in either one of them.

Even in this case, the thickness increase may be suppressed or reduced.

However, the filling members may be positioned in the vicinities of the positive and negative electrode current collecting tabs 15 and 35 on the opposite surfaces thereof.

3. Manufacturing Method of Non-Aqueous Electrolyte Lithium Ion Rechargeable Battery Next, a manufacturing method of a non-aqueous electrolyte lithium ion rechargeable battery will be described in more detail.

(Manufacture of Strip-Shaped Positive Electrode and Attachment of Current Collecting Tab)

The positive electrode 10 may be manufactured by the example method described below.

A material for forming a positive electrode active material layer may be dissolved in an organic solvent and/or water to form a positive electrode mixture slurry, and the positive electrode mixture slurry may be coated on a current collector.

Accordingly, a coating layer may be formed.

Next, the coating layer may be dried.

Next, the dried coating layer may be rolled together with the positive electrode current collector.

Accordingly, the positive electrode 10 may be manufactured.

Next, a positive electrode current collecting tab 15 may be welded to a front end of the positive electrode 10 parallel to the vertical length direction.

(Manufacture of Strip-Shaped Negative Electrode and Attachment of Current Collecting Tab)

The negative electrode 30 may be manufactured by the example method described below.

First, a mixture containing a suitable ratio of a negative active material and a binding agent may be dissolved in a solvent (e.g., water and/or an organic solvent such as N-methyl-2-pyrrolidone) to form a slurry.

Next, the slurry may be formed on a negative electrode current collector (e.g., coated), and may be dried to form a negative active material layer.

The negative active material layer may be compressed to a desired or suitable thickness.

Accordingly, a negative electrode 30 may be manufactured.

The thickness of the negative active material layer is not specifically limited.

When lithium metal is used as the negative active material layer, the lithium metal foil may overlap the negative electrode current collector.

Next, a negative electrode current collecting tab 35 may be welded to a front end of the negative electrode 30 along the vertical length direction thereof.

(Manufacturing Method of Electrode Assembly and Battery)

A positive electrode 10 may be stacked on one surface of the separator 20b.

Next, a positive electrode filling member 51 may be positioned in the vicinity of the positive electrode current collecting tab 15 along a surface direction.

In some embodiments, a portion 51b of the positive electrode filling member 51 in a thin region may be thicker than a portion 51a in a thick region.

In some embodiments, the surface of the positive electrode current collecting tab 15 may be aligned with the surface of the positive electrode filling member 51, such that the surfaces are flat, or parallel to each other without having a step.

The width of the positive electrode filling member 51 may be the same as that of the separator 20b. The length L1 of the positive electrode filling member 51 may be predetermined or set to fill the entire space 150. The adhesive layer may be pre-formed on the opposite surfaces of the separator 20b.

Next, a negative electrode 30 may be stacked on the other surface of the separator 20b.

Next, a negative electrode filling member 61 may be positioned in the vicinity of the negative electrode current collecting tab 35 along a surface direction. In some embodiments, a portion 61b of the negative electrode filling member 61 in the thin region may be thicker than a portion 61a in the thick region.

The surface of the negative electrode current collecting tab 35 may be aligned with the surface of the negative electrode filling member 61. The width of the negative electrode filling member 61 may be the same as that of the separator 20b. The length L2 of the negative electrode filling member 61 may be predetermined or set to fill the entire space 160.

Next, a separator 20a may be stacked on the surfaces of the positive electrode current collecting tab 15 and on the positive electrode filling member 51.

An adhesive layer may be formed on the opposite surfaces of the separator 20a. Accordingly, a stacked electrode assembly is manufactured.

Next, the stacked electrode assembly may be wound around a winding core to manufacture a cylindrical electrode assembly 1a.

Next, the cylindrical electrode assembly 1a may be pressed in the direction of the arrows P. Heat pressing may be performed if an adhesive layer is present.

The heat press conditions are not specifically limited, but may include, for example, a temperature of 25° C. to 150° C. and a pressure of 10 to 100 kgf/cm$^2$. In some embodiments where no heating is involved, a suitable press pressure may be 10 to 100 kgf/cm$^2$.

Accordingly, a flattened cylindrical electrode assembly 1a may be manufactured.

The filling members 51 and 61 may be positioned in the vicinities of the current collecting tabs 15 and 35 along the surface directions. Accordingly, a pressure applied to the electrode assembly 1a may be substantially uniform throughout the portions of the electrode assembly that contain filling members 51 and 61, as well as the portions that contain current collecting tab 15 and 35. For example, non-uniformity of the pressure may be suppressed or reduced.

As a result, distortion inside the non-aqueous electrolyte rechargeable battery 1 may be suppressed or reduced, and a thickness increase of the non-aqueous electrolyte rechargeable battery 1 may also be suppressed or reduced.

Next, a flattened cylindrical electrode assembly 1a may be inserted into an exterior body (e.g., a laminate film) along with a non-aqueous electrolyte solution, and the exterior body may then be sealed, thereby manufacturing the non-aqueous electrolyte rechargeable battery 1.

When the exterior body is sealed, the current collecting tabs 15 and 35 may be allowed to protrude out of the exterior body.

4. Modified Example

FIG. 4 illustrates a modified example of the current example embodiment.

In this modified example embodiment, a positive electrode 10, a separator 20, and a negative electrode 30 are sequentially stacked to form an stacked electrode assembly 1b, and the positive and negative electrode current collecting tabs 15 and 35 are formed at opposite ends of the stacked electrode assembly 1b in a thickness direction thereof (e.g., at the top and bottom of the stack).

The stacked electrode assembly 1b may be accommodated in an exterior body 200.

In this modified example, a space may be formed in a region surrounded by the exterior body 200, the positive electrode current collecting tab 15, and the stacked electrode assembly 1b.

Similarly, a space may be formed in a region surrounded by the exterior body 200, the negative electrode current collecting tab 35, and the stacked electrode assembly 1b.

Accordingly, in the current modified example, filling members may be formed in each of the spaces to fill the spaces.

For example, a positive electrode filling member 51 may be formed in the vicinity of the positive electrode current collecting tab 15 along a surface direction, while a negative electrode filling member 61 may be formed in the vicinity of the negative electrode current collecting tab 35 along a surface direction.

The detailed configurations of the positive and negative electrode filling members 51 and 61 may be the same as those in the example embodiment described above.

The same effect obtained by the example embodiment described above may also obtained by the modified example.

Example Embodiment 1

Manufacture of Positive Electrode

Lithium cobalt oxide, acetylene black, and polyvinylidene fluoride (PVDF) in a mass ratio of 98:1:1 were dissolved and dispersed in N-methyl pyrrolidone, thereby manufacturing a positive electrode mixture slurry. Next, the positive electrode mixture slurry was coated on opposite surfaces of a current collector formed of an aluminum foil having a thickness of 12 μm. Next, a coating layer was dried and rolled to manufacture a positive electrode active material layer. The total thickness of the positive electrode 10 was 120 μm. Next, an aluminum lead wire having a thickness of 80 μm was welded as a positive electrode current collecting tab 15 to a front end of the positive electrode 10 along a length direction.

The length and width of the positive electrode 10 were selected to be smaller than those of the separators 20a and 20b (described below). Accordingly, a thin region was formed in the vicinity of the positive electrode 10.

(Manufacture of Negative Electrode)

Natural graphite, carboxymethyl cellulose, and styrene-butadiene rubber (SBR) in a mass ratio of 98:1:1 were dissolved and dispersed in water, thereby manufacturing a negative electrode mixture slurry. Next, the negative electrode mixture slurry was coated on opposite surfaces of a current collector of a thin copper foil having a thickness of 8 μm, and was then dried. Next, a coating layer was dried and rolled to obtain a negative active material layer. The total thickness of the negative electrode 30 was 120 μm. Next, a nickel lead wire was welded as a negative electrode current collecting tab 35 to a front end of the negative electrode 30.

The length and width of the negative electrode 30 were selected to be greater than those of the positive electrode 10, and were set to be smaller than those of the separators 20a and 20b. Accordingly, a thin region was formed in a vicinity of the negative electrode 30.

(Manufacture of Separator)

Corona-treated porous polyethylene separator films having a thickness of 12 μm were prepared as separators 20a and 20b.

PVDF was dissolved in NMP to manufacture a slurry. The solid concentration of the slurry was 8 wt %. Next, the slurry as coated on opposite surfaces of the separators 20a and 20b to form a coating layer. Next, the separators 20a and 20b including the coating layer were cleaned to phase-separate the PVDF. Accordingly, an adhesive layer was formed. The thickness of the adhesive layer was 2 μm.

(Manufacture of Electrode Assembly and Battery)

A positive electrode 10 was stacked on one surface of the separator 20b. Next, a porous polyethylene separator film having a thickness of 80 μm (e.g., the same thickness as the positive electrode current collecting tab 15) was prepared as a positive electrode filling member 51. The length L1 of the positive electrode filling member 51 was 30 mm, and a width was the same as those of the separators 20a and 20b. Next, the positive electrode filling member 51 was positioned in the vicinity of the positive electrode current collecting tab 15 along the surface direction.

Next, a negative electrode 30 was stacked on the other surface of the separator 20b. Next, a porous polyethylene separator film having a thickness of 80 μm (e.g., the same thickness as the negative electrode current collecting tab 35) was prepared as a negative electrode filling member 61. The length L2 of the negative electrode filling member 61 was 30.3 mm, and the width was the same as those of the separators 20a and 20b.

The negative electrode filling member 61 was positioned in the vicinity of the negative electrode current collecting tab 35 along a surface direction. Next, a separator 20a was stacked on the surface of the positive electrode current collecting tab 15 and the positive electrode filling member 51. Accordingly, an stacked electrode assembly was manufactured.

The stacked electrode assembly was wound around a winding core with a diameter of 3 cm. The winding direction was set to be parallel to the horizontal length direction of the stacked electrode assembly. Accordingly, a cylindrically wound electrode assembly 1a was manufactured.

An end portion of the electrode assembly 1a was fixed by a tape, and the winding core was removed. Next, the electrode assembly 1a was inserted between two metal plates, each having a thickness of 3 cm. Next, the electrode assembly 1a was pressed under 730 kPa for 120 s while being heated to 98° C. Accordingly, a flattened cylindrical electrode assembly 1a was obtained.

When a planar cross-section of the electrode assembly 1a is observed with the naked eye, the positive and negative electrode filling members 51 and 61 fill the entire spaces 150 and 160 along the horizontal length direction of the spaces 150 and 160 (e.g., along the MD direction of the constituent electrodes, as shown in FIG. 2).

(Manufacture of Battery)

The electrode assembly 1a and an electrolyte solution were decompressed and sealed in a laminate film including a triple layer of polypropylene/aluminum/nylon in such a configuration as to allow two lead wires to protrude outward, thereby manufacturing a battery. A suitable amount of $LiPF_6$ was dissolved in 3:7 volume ratio of ethylene carbonate and ethyl methyl carbonate to form a 1 M $LiPF_6$ electrolyte solution. This battery was inserted between two metal plates, each having a thickness of 3 cm and heated to 80° C., and was held therebetween for 5 min. The non-aqueous electrolyte rechargeable battery 1 was manufactured by the process described above.

(Characteristic Evaluation)

A charging and discharging cycle test was carried out on the non-aqueous electrolyte rechargeable battery 1 manufactured as described above. In the first cycle, charging was performed at 0.2 C using a constant-current constant-voltage (CCCV) program with a 0.05 C cutoff, and discharging was performed at 0.5 C using a CC discharge with a 3.5 V cutoff. Starting from the second cycle, the charging and discharging current rate was set to 0.7 C, and the charging and discharging test was continued using the same programs and cutoff voltages.

A flat metal plate was pressed against the non-aqueous electrolyte rechargeable battery 1 with a force of 30 g/cm$^2$ to measure the thickness of the non-aqueous electrolyte rechargeable battery 1 during cycle testing. Thicknesses were measured after 1 cycle, 100 cycles, 200 cycles, 300 cycles, 400 cycles, and 500 cycles.

Comparative Example

The same processes used to manufacture Example Embodiment 1 were performed without the positive and negative electrode filling members 51 and 61. The evaluation results are summarized and shown in Table 1.

As shown in Table 1, changes in the thickness of Example 1 were significantly suppressed or reduced, compared to changes in the thickness of the Comparative Example.

TABLE 1

| Unit (mm) | 1 cycle | 100 cycles | 200 cycles | 300 cycles | 400 cycles | 500 cycles |
|---|---|---|---|---|---|---|
| Example 1 | 4.102 | 4.150 | 4.166 | 4.178 | 4.199 | 4.233 |
| Comparative Example | 4.099 | 4.189 | 4.256 | 4.278 | 4.289 | 4.389 |

Examples 2 to 10

The same process as in Example 1 was repeated for Examples 2 to 10, except that thicknesses of the positive and negative electrode filling members 51 and 61 were set to the thicknesses shown in Table 2.

The thicknesses of the filling members in the thick and thin regions were varied. In Example 2, the thickness of the filling member in the thick region was set to be the same as the thickness of the tab, e.g., 80 μm, and the thickness of the filling member in the thin region was set to 200 μm. Accordingly, in Example 2, the difference between the thickness of the filling member in the thin region and the thickness of the filling member in the thick region was identical to the thickness of the electrode (=120 μm). The surface of the filling member was aligned with the surface of the current collecting tab.

In Examples 3 to 10, the thickness of the filling member in the thick region and the thickness of the filling member in the thin region were varied.

As shown in Table 2, the cell thickness increase after 300 cycles was maximally suppressed or decreased in Example 2. In addition, after 300 cycles, the Examples (e.g., Examples 8-10) each including a filling member with a thick region thickness of more than 80 μm were thinner than the Examples (e.g., Examples 5-7) each including a filling member with a thick region thickness of less than 80 μm.

TABLE 2

| | Example 2 | Example 3 | Example 4 | Example 5 | Example 6 | Example 7 | Example 8 | Example 9 | Example 10 |
|---|---|---|---|---|---|---|---|---|---|
| Thickness of filling member in thick region (μm) | 80 | 80 | 80 | 40 | 40 | 40 | 120 | 120 | 120 |
| Thickness of filling member in thin region (μm) | 200 | 240 | 160 | 200 | 240 | 160 | 200 | 240 | 160 |
| Thickness of cell (mm) after 300 cycles | 4.135 | 4.220 | 4.211 | 4.256 | 4.242 | 4.210 | 4.199 | 4.188 | 4.201 |

Although the above example embodiments have been described with reference to the attached drawings, the present disclosure is not limited to these embodiments.

It is to be understood that a person or ordinary skill in the art could conceive of various altered or modified examples within the scope of the technical idea set forth in the claims, and it is to be understood that such examples also naturally belong to the technical scope of the disclosure.

As used herein, expressions such as "at least one of" and "one of", when preceding a list of elements, modify the entire list of elements and do not modify the individual elements of the list. The use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The above-disclosed subject matter is to be considered illustrative and not restrictive, and the appended claims and equivalents thereof are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

DESCRIPTION OF SOME OF THE SYMBOLS

1: non-aqueous electrolyte rechargeable battery
1a: stacked electrode assembly
10: positive electrode
15: positive electrode current collecting tab
20a, 20b: separator
30: negative electrode
35: negative electrode current collecting tab
51: positive electrode filling member
61: negative electrode filling member

What is claimed is:

1. A non-aqueous electrolyte rechargeable battery comprising:

a stacked electrode assembly in which electrodes and a separator are sequentially stacked;

current collecting tabs attached to one or more portions of surfaces of the electrodes; and insulating filling members positioned horizontally adjacent to the current collecting tabs along the surfaces of the electrodes, each filling member having a first surface and a second surface opposite the first surface, the first and second surfaces of each filling member being normal to the direction of electrode stacking or applied pressure, the first and second surfaces of each filling member being horizontally aligned with a first surface and a second surface, respectively, of a corresponding one of the current collecting tabs, the first and second surfaces of each current collecting tab being normal to the direction of electrode stacking or applied pressure, the first surface of each filling member and the first surface of the current collecting tab horizontally adjacent to the first surface of the filing member being flat and parallel to each other without having a step, and the second surface of each filling member and the second surface of the current collecting tab horizontally adjacent to the second surface of the filing member being flat and parallel to each other without having a step, wherein each filling member does not cover the first or the second surface of the corresponding current collecting tab, when viewed in a stacking direction of the electrode assembly.

2. The non-aqueous electrolyte rechargeable battery of claim 1, wherein the stacked electrode assembly is an electrode assembly in which the electrodes and the separator are wound, the current collecting tabs are positioned at innermost circumferential parts of the electrode assembly, and the filling members are positioned in spaces surrounded by the electrode assembly and the electrodes.

3. The non-aqueous electrolyte rechargeable battery of claim 2, wherein the stacked electrode assembly includes one or more thick regions where the separator is formed over one of the electrodes at the vertical center of the stacked electrode assembly, and one or more thin regions where the separator is not formed over one of the electrodes at the vertical center of the stacked electrode assembly, and portions of the filling members in the thin regions are thicker than portions of the filling members in the thick regions.

4. The non-aqueous electrolyte rechargeable battery of claim 2, wherein the first and second surfaces of a first current collecting tab of the current collecting tabs directly contacts the electrode to which the first current collecting tab is attached.

5. The non-aqueous electrolyte rechargeable battery of claim 1, wherein the filling members have a horizontal length that substantially fills the stacked electrode assembly in the horizontal direction.

6. The non-aqueous electrolyte rechargeable battery of claim 1, wherein the distance between the positive and negative electrodes along the direction of electrode stacking is substantially uniform across the flattened surface direction of the stacked electrode assembly.

7. The non-aqueous electrolyte rechargeable battery of claim 1, wherein the electrodes include a positive electrode and a negative electrode on opposite sides of the separator, and the current collecting tabs include a positive current collecting tab attached to a surface of the positive electrode facing away from the separator and a negative current collecting tab attached to a surface of the negative electrode facing away from the separator.

8. The non-aqueous electrolyte rechargeable battery of claim 7, wherein the filling members include a positive filling member corresponding to the positive current collecting tab and a negative filling member corresponding to the negative current collecting tab and being spaced apart in the stacking direction from the positive filling member.

9. The non-aqueous electrolyte rechargeable battery of claim 7, wherein the filling members include a positive filling member corresponding to the positive current collecting tab and a negative filling member corresponding to the negative current collecting tab, the positive filling member has a thin region overlapping the positive electrode and a thick region not overlapping the positive electrode, and the negative filling member has a thin region overlapping the negative electrode and a thick region not overlapping the negative electrode.

10. A method of manufacturing a non-aqueous electrolyte rechargeable battery, comprising:

forming current collecting tabs on one or more portions of surfaces of electrodes;

installing insulating filling members horizontally adjacent to the current collecting tabs along the surfaces of the electrodes, each filling member having a first surface and a second surface opposite the first surface, the first and second surfaces of each filling member being normal to the direction of electrode stacking or applied pressure, the first and second surfaces of each filling member being horizontally aligned with a first surface and a second surface, respectively, of a corresponding one of the current collecting tabs, the first and second surfaces of each current collecting tab being normal to the direction of electrode stacking or applied pressure, the first surface of each filling member and the first surface of the current collecting tab horizontally adjacent to the first surface of the filing member being flat and parallel to each other without having a step, and the second surface of each filling member and the second surface of the current collecting tab horizontally adjacent to second surface of the filing member being flat and parallel to each other without having a step, wherein each filling member does not cover the first or the second surface of the corresponding current collecting tab, when viewed in a stacking direction of the electrode assembly;

manufacturing a stacked electrode assembly by sequentially stacking the electrodes including the current collecting tabs and the filling members with a separator; and pressing the stacked electrode assembly.

11. The method of claim 10, wherein the stacked electrode assembly is an electrode assembly in which the electrodes and the separator are wound, the current collecting tabs are positioned at innermost circumferential parts of the electrode assembly, and the filling members are positioned in spaces surrounded by the electrode assembly and the electrodes.

12. The method of claim 11, wherein the stacked electrode assembly includes one or more thick regions where the separator is formed over one of the electrodes at the vertical center of the stacked electrode assembly and one or more thin regions where the separator is not formed over one of the electrodes at the vertical center of the stacked electrode assembly, and portions of the filling members in the thin regions are thicker than portions of the filling members in the thick regions.

13. The method of claim 10, wherein the filling members have a horizontal length that substantially fills the stacked electrode assembly in the horizontal direction.

14. The method of claim 10, wherein the distance between the positive and negative electrodes along the direction of electrode stacking is substantially uniform across the flattened surface direction of the stacked electrode assembly.

* * * * *